UNITED STATES PATENT OFFICE.

HARRY WORSER SCOTT, OF STRATFORD, NEW ZEALAND.

LIQUID FOR BRANDING CATTLE.

SPECIFICATION forming part of Letters Patent No. 629,526, dated July 25, 1899.

Application filed November 25, 1898. Serial No. 697,487. (No specimens.)

*To all whom it may concern:*

Be it known that I, HARRY WORSER SCOTT, chemist, a subject of the Queen of Great Britain and Ireland, and a resident of Stratford, in the provincial district of Taranaki, in the Colony of New Zealand, have invented a certain new and useful Liquid Cattle-Brand, of which the following is a specification.

The subject of my invention has the advantage of efficiently marking an animal without causing it pain or injuring its hide. It can be easily and cheaply manufactured when required, or it can be stored in quantity without deterioration by exposure.

I have discovered that a liquid cattle-brand can be made from hydrates of lime, ammonia, or soda, preferably caustic or hydrate of soda or the chemical equivalents of the same. The caustic or hydrate of soda or other of the above hydrates is mixed with water in the proportions of six parts of caustic or hydrate of soda or other such hydrates and twelve parts of water, though it may be advantageous to alter these proportions when it is considered necessary, by reason of climatic conditions or the breed of the animal rendering the skin thicker, by increasing the caustic or hydrate of soda or other such hydrates to not more than twelve parts. To make this mixture of the necessary consistence for branding purposes, a thickening mixture must be used. Common starch answers the purpose; but the mixture I consider best is as follows: Hematite and kerosene in the proportions of one part hematite and eight parts kerosene. One part of bitter aloes is then added, so that cattle will not lick it off after being applied. The hematite is used not only for thickening, but for coloring purposes, it being both cheap and effective. As a substitute for kerosene any other petroleum-oil may be used with advantage, if more easily or more cheaply obtained. The thickening mixture is added to the caustic soda and water until the whole is of the consistency of thin paint. This is then to be applied to the hair or wool of the animal, and the hide is branded in a substantial permanent manner. An ordinary sheep or branding tool may be used, one with a broad edge of about half an inch being preferable.

I disclaim the use of hydrate of potash.

Having now described my invention, what I claim as new, and desire to secure by Letters Patent, is—

A cattle-branding liquid consisting of hydrate of soda, water, kerosene, hematite and aloes in the proportions substantially as described.

In witness whereof I have hereunto set my hand in presence of two witnesses.

HARRY WORSER SCOTT.

Witnesses:
   W. H. QUICK,
   C. O. ROSENBERG.